(12) United States Patent
Sundaram et al.

(10) Patent No.: US 7,558,661 B2
(45) Date of Patent: Jul. 7, 2009

(54) ADAPTIVE MANEUVER BASED DIAGNOSTICS FOR VEHICLE DYNAMICS

(75) Inventors: Padma Sundaram, West Bloomfield, MI (US); Aleksander B. Hac, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 414 days.

(21) Appl. No.: 11/415,543

(22) Filed: May 2, 2006

(65) Prior Publication Data
US 2007/0260383 A1 Nov. 8, 2007

(51) Int. Cl.
*G06G 7/76* (2006.01)
(52) U.S. Cl. .......................... 701/70; 701/29
(58) Field of Classification Search ............. 701/41–43, 701/70, 29; 702/182–183
See application file for complete search history.

(56) References Cited

U.S. PATENT DOCUMENTS

| 6,035,251 | A | 3/2000 | Hac et al. |
| 6,499,559 | B2 * | 12/2002 | Mc Cann et al. ............ 180/446 |
| 6,564,131 | B2 * | 5/2003 | Sebastian et al. ............... 701/41 |
| 6,623,089 | B2 | 9/2003 | Amberkar |
| 6,658,342 | B1 | 12/2003 | Hac |
| 6,701,237 | B2 * | 3/2004 | Sebastian et al. ............... 701/43 |
| 7,181,326 | B2 * | 2/2007 | Lin et al. ....................... 701/41 |
| 2006/0136112 | A1 * | 6/2006 | Lin et al. ....................... 701/70 |

* cited by examiner

*Primary Examiner*—Yonel Beaulieu
(74) *Attorney, Agent, or Firm*—Thomas N. Twomey

(57) ABSTRACT

A vehicle stability control system diagnostic strategy, wherein the diagnostic strategy may be adaptively applied based upon the identified maneuver states of the vehicle. The diagnostic architecture contains three vehicle state observers (i.e., models) each based on inputs from only two of the three sensors (yaw rate, lateral acceleration, and hand wheel angle). More particularly, the first observer does not consider lateral acceleration input. The second observer does not consider yaw rate sensor input and the third does not consider hand wheel angle (UWA) sensor input in determining the vehicle state. However, estimated vehicle speed input is used by all the observers. For example, the first observer detects a maneuver state based on yaw rate and HWA and vehicle speed inputs. Then it diagnoses the lateral acceleration sensor failure based on the observer output.

3 Claims, 13 Drawing Sheets

ADAPTIVE MANEUVER BASED DIAGNOSTICS FOR VEHICLE DYNAMICS

BACKGROUND

The disclosure is directed to vehicular stability control, and more particularly, to a method for enhancing vehicle stability control.

A vehicle stability control (VSC) system works by detecting when a driver has lost some degree of control. These systems are also known as ESP (electronic stability program) systems or VSE (vehicle stability enhancement) systems in the art. These systems automatically stabilize the vehicle to help the driver regain control. A central processor takes information from a number of sensors, and then determines whether the car is in a stable or unstable state. By combining the data from wheel speed sensors, steering angle sensors, yaw rate sensors (measuring the amount a vehicle rotates around its vertical center axis), and lateral acceleration sensors (measuring the amount of sideways acceleration generated by the vehicle), the central processing unit can actually detect when a vehicle is behaving in a way inconsistent with how the driver intends. If the processor does detect instability such as a slide produced by a sudden swerve, it automatically applies brake pressure to a select wheel (or wheels) to maintain or restore control.

ESP system safety analysis has identified that sensor faults, specifically faults of the yaw rate, lateral acceleration and hand wheel angle signals, require detection within a short period of time. One component integrated in the ESP system is an on-line sensor monitoring system that is mainly used for detecting faults in sensors as early as possible so the fail control system does not activate unnecessarily. Those faults, which cause the sensor output to exceed the operational range of the measured variable (for example, lateral acceleration significantly exceeding 10 m/s$^2$) are relatively easy to detect and can typically be detected by the sensor circuit. Those faults resulting in erroneous sensor outputs, but still within the normal range of the measured signals, are more difficult to detect, and are the subject of this disclosure.

Current systems have a dynamic model based diagnostic strategy whose intent is to detect a failure of a sensor in the normal range for the measured signal. One available strategy performs sensor diagnostics only when the ESP system is active and does not activate failure detection when the vehicle is in the linear range of handling (that is during normal operation). If model based signal correlation discrepancy exists for more than several seconds after ESP goes active, a fault is declared. The first drawback with this strategy is that it is a reactive approach to a fault rather than a proactive one. If it is a sensor failure that caused an unwanted activation, this strategy can wait several seconds before declaring it a fault. The second drawback is that it can declare a false fault if the vehicle is in a true ESP maneuver for a prolonged period, even when there is no true fault (for example, in case of testing, demo, etc.). The third drawback is that it does not monitor sensor condition during normal driving.

Accordingly, there is a need for an ESP system capable to only use two of the three signals (steering angle sensors, yaw rate sensors and lateral acceleration sensors) in detecting a maneuver state, configured to detect even small deviations of the third missing signal successfully in steady state linear handling range of the vehicle. Additionally, there is a need for an ESP system able to selectively apply diagnostic thresholds based on the maneuver state and also if the vehicle is going straight or is in a turning maneuver. Furthermore, there is a need for an ESP system having the ability to isolate a fault successfully within a short period of time and not falsely call it a fault if the vehicle is truly in a quick transient or in a highly non-linear maneuver.

SUMMARY OF THE INVENTION

In one aspect, a vehicle stability control system diagnostic strategy, may include a diagnostic strategy that is adaptively applied based upon the identified maneuver states of the vehicle. The diagnostic architecture may contain three vehicle state observers (i.e., models), each based on inputs from only two of the three sensors (yaw rate, lateral acceleration and hand wheel angle). More particularly, the first observer may not consider lateral acceleration input. The second observer may not consider yaw rate sensor input and the third may not consider hand wheel angle (HWA) sensor input in determining the vehicle state. However, estimated vehicle speed input may be used by all the observers. For example, the first observer may detect a maneuver state based on yaw rate and HWA and vehicle speed inputs. Then, it may diagnose the lateral acceleration sensor failure based on the observer output. The diagnostics may be based on vehicle dynamics correlations that hold in steady state linear range conditions. Similarly, the other two observers may detect maneuver state and diagnose the respective signals. Advantageous variants may include the use of a proactive sensor diagnostics strategy that provides increased coverage during steady state linear range maneuvers while simultaneously detecting faults within the required fault response time.

DETAILED DESCRIPTION

For the purposes of this disclosure, the acronyms VSC (vehicle stability control) and ESP (electronic stability program) may be used interchangeably with a vehicular stability control system. A control process for controlling the driving stability of a motor vehicle is known in the prior art. For example, a method of improving vehicle handling and stability utilizing a desired yaw rate and lateral velocity of a vehicle in a steady-state condition is disclosed in U.S. Pat. No. 6,658,342 to Hac, which is incorporated herein by reference. Another vehicle stability control method utilizing yaw rate and side angle slip (i.e., angle between a vehicle's actual direction of travel and the direction towards which it is pointing) is disclosed in U.S. Pat. No. 6,035,251 to Hac et al., which is incorporated herein by reference. Furthermore, a method for estimating the yaw rate of a vehicle is disclosed in U.S. Pat. No. 6,623,089 to Amberkar, which is incorporated herein by reference.

Figure 1:
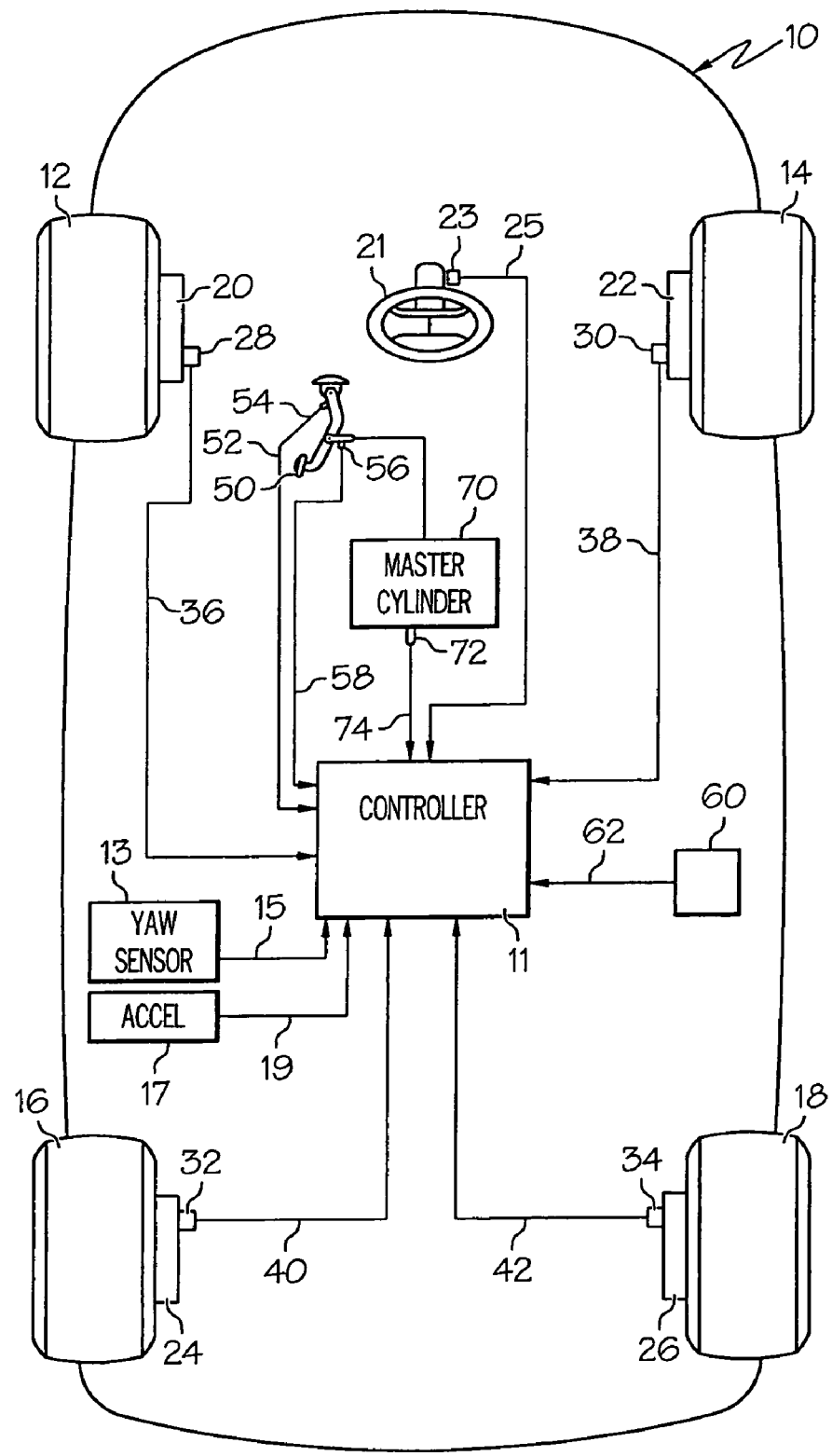
FIG. 1 is a schematic diagram of an active brake control system incorporating the disclosed vehicular stability control system.

Referring to FIG. 1, a vehicle stability control system, generally designated 10, may include an active brake control system with a conventional microprocessor-based controller 11 for controlling brakes 20, 22, 24 and 26, for respective vehicle wheels 12, 14, 16 and 18. The controller 11 may include such conventional elements (not shown) as a central processing unit (CPU) having control circuitry and arithmetic logic circuitry, memory devices including read only memory devices (ROM) for permanent read only data storage and random access memory devices (RAM) for both volatile and nonvolatile read/write data storage.

The controller 11, when activated in response to manual application of ignition power thereto, may execute a series of control and diagnostic operations for reading various input signals applied thereto and for issuing control and diagnostic signals to various vehicle actuators and indicators. The input signals applied to the controller 11 may include an output signal on line 15 from a conventional yaw rate sensor 13, an output signal on line 19 from conventional accelerometer 17 indicating lateral vehicle acceleration, an output signal on line 25 from a conventional digital steering wheel angle sensor 23 indicating the degree of rotational displacement of steering wheel 21 away from a predetermined initial angle, output signals on lines 36, 38, 40 and 42 from respective conventional wheel speed sensors 28, 30, 32, and 34, output signal on line 54 from conventional brake pedal displacement sensor 52 indicating a degree of depression of the brake pedal 50 away from a rest position, output signal on line 58 from conventional brake pedal switch 56 indicating whether the brake pedal 50 is depressed away from a rest position. Alternatively, a master cylinder brake pressure sensor 72 can be used instead of, or in addition to, the brake pedal displacement sensor 52 to indicate the magnitude of brake input by the driver.

Wheel speed sensor output 36, 38, 40 and 42 can be used to determine if a vehicle (not shown) is turning a corner. For example, during cornering the outside tires of a vehicle have to travel further than the inside tires, so they rotate faster than the inside tires. Furthermore, during an intervention of the VSC system, the system automatically applies braking to individual wheels, resulting in differences in wheel speeds. These differences in wheel speeds can be calculated to help modify stability control operation in corners.

The most common types of slides are referred to as under-steer and over-steer. In an under-steer situation, the front of the vehicle (not shown) plows towards the outside of a turn without following the curve of the turn. When the stability control system detects under-steer, it applies light brake presssure 24 or 26 to the inside rear wheel 16 or 18, respectively. This helps "tug" the front of the vehicle back onto the intended path around the curve. In an over-steer situation, the rear of the vehicle fishtails toward the outside of a turn, increasing the chance of a spin. To counteract such a situation, the stability system applies braking 20 or 22 to the outside front wheel 12 or 14, respectively to bring the rear end back in line. The system works when the vehicle starts to slide on a straight road having wet, snowy, or icy conditions the same as it does when turning corners.

Redundant sensors may be provided for the above sensors to improve fault detection or tolerance. For example, conventional analog steer angle sensors (not shown) may be provided in addition to digital steer angle sensor 23 for transducing a steer angle signal substantially redundant with the digital steer angle 23 output signal on line 25. In another example, vehicle speed signal on line 62, such as from a conventional vehicle speed sensor 60 located in the transmission may be redundant to the described output signals on lines 36, 38, 40 and 42 from respective conventional wheel speed sensors 28, 30, 32, and 34.

The described conventional sensors 13, 17, 23, 28, 30, 32, 34, 54 and 56 are implemented in a manner generally known to those possessing ordinary skill in the art. Vehicle ignition voltage is applied to the sensors and actuators of FIG. 1 substantially at the time ignition voltage is manually applied to controller 11, to energize such sensor and actuators in a manner generally understood in the art.

The control operations of controller 11 provide for vehicle braking control in a plurality of control modes including a base braking mode, an anti-lock braking mode, a traction control braking mode, and a closed-loop yaw rate control mode. Conventional pressure transducer 72 disposed within the master cylinder 70 transduces brake fluid pressure within the master cylinder 70 into an output signal 74 applied to controller 11, indicating the degree of displacement of the brake pedal 50. Controller 11 generates and outputs brake pressure modulation commands to dedicated brake pressure control actuators (not shown) for varying the brake pressure at the respective wheels 12, 14, 16 and 18.

Figure 2:
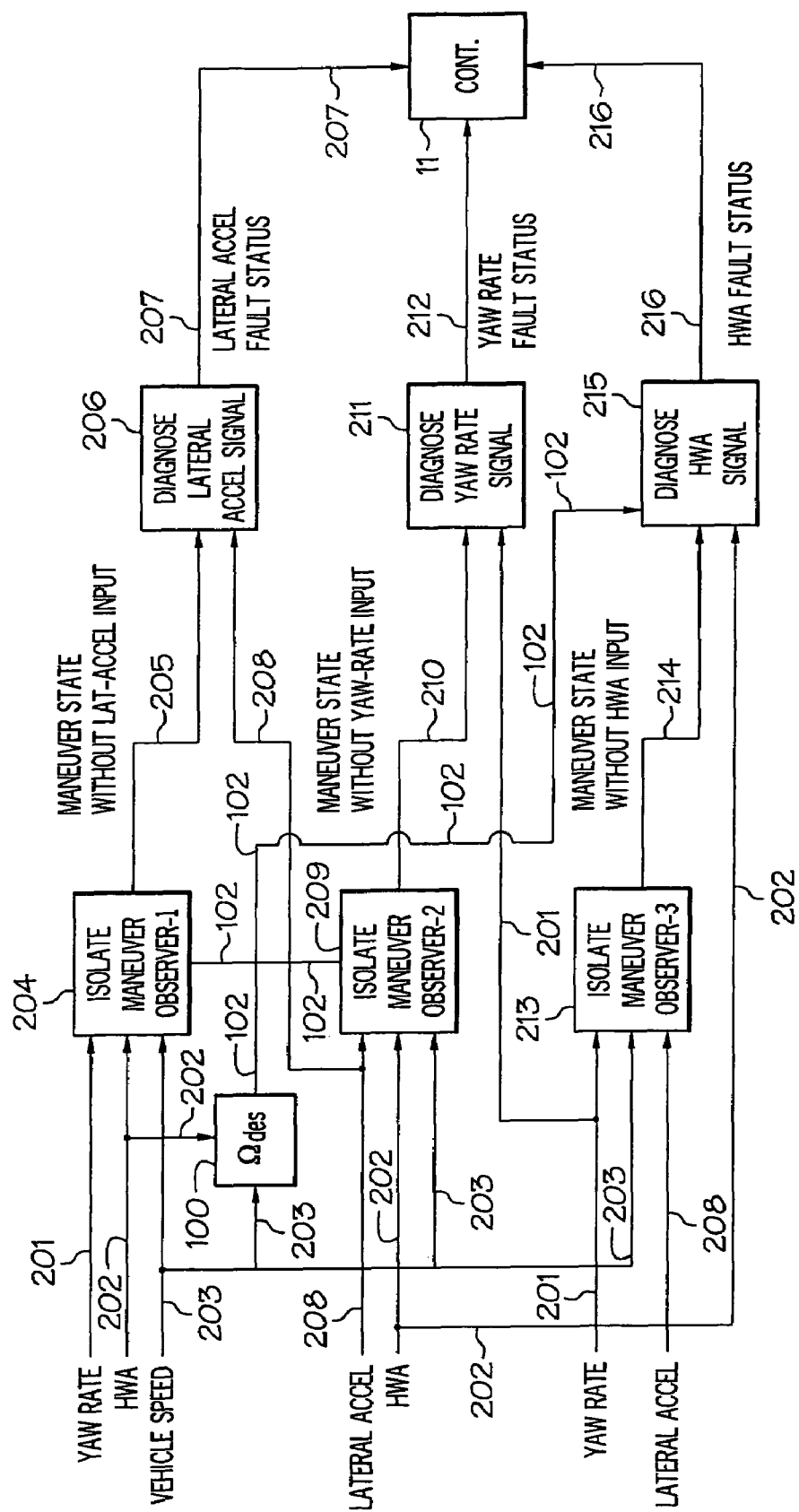
FIG. 2 is a flowchart showing one aspect of the disclosed vehicle stability control diagnostic strategy.

A general functional layout of the diagnostic strategy is shown in FIG. 2. Referring to FIG. 2, the desired yaw rate dynamic ($\Omega_{des}$) signal 102 may be determined within the reference model 100 of the VSC system and the process of determining it is known to those skilled in the art (see, for example, U.S. Pat. Nos. 6,035,251 and 6,658,342). First, the yaw rate desired steady-state, $\Omega_{dss}$ is calculated as a function of the HWA 202 and vehicle speed 203 from a look up table, subsequently, $\Omega_{des}$ is determined by passing $\Omega_{dss}$ through dynamic filters. Both these signals are not compensated for bank angle and do not use yaw rate 201 or lateral acceleration 208 sensor inputs. The $\Omega_{des}$ signal 102 may be received by at least one or may be received by a plurality of algorithms, such as but not limited to, a lateral acceleration maneuver state algorithm 204, a yaw rate sensor maneuver state algorithm 209 and a HWA diagnostic algorithm 215.

As shown in FIG. 2, in order to diagnose a fault of one of the three sensors (HWA 202, yaw rate 201 and lateral acceleration 208), two remaining sensors and vehicle speed input 203 are used to determine whether the vehicle is at steady state and in the linear range of handling, and that it is not on a road with a significant bank angle. If all these conditions are satisfied, then the failure of the investigated sensor is detected when its output sufficiently deviates from the output predicted by the model (observer) using the remaining sensors. The lateral acceleration fault status signal 207, the yaw rate fault status signal 212 and the HWA fault status signal 216 may be received by the controller 11, wherein the controller 11 may be configured to take action on a true fault by disabling said vehicle stability control system 10 to prevent unwanted activation, although alternatively, the controller 11 may be configured to take no action on a false fault.

Figure 3:
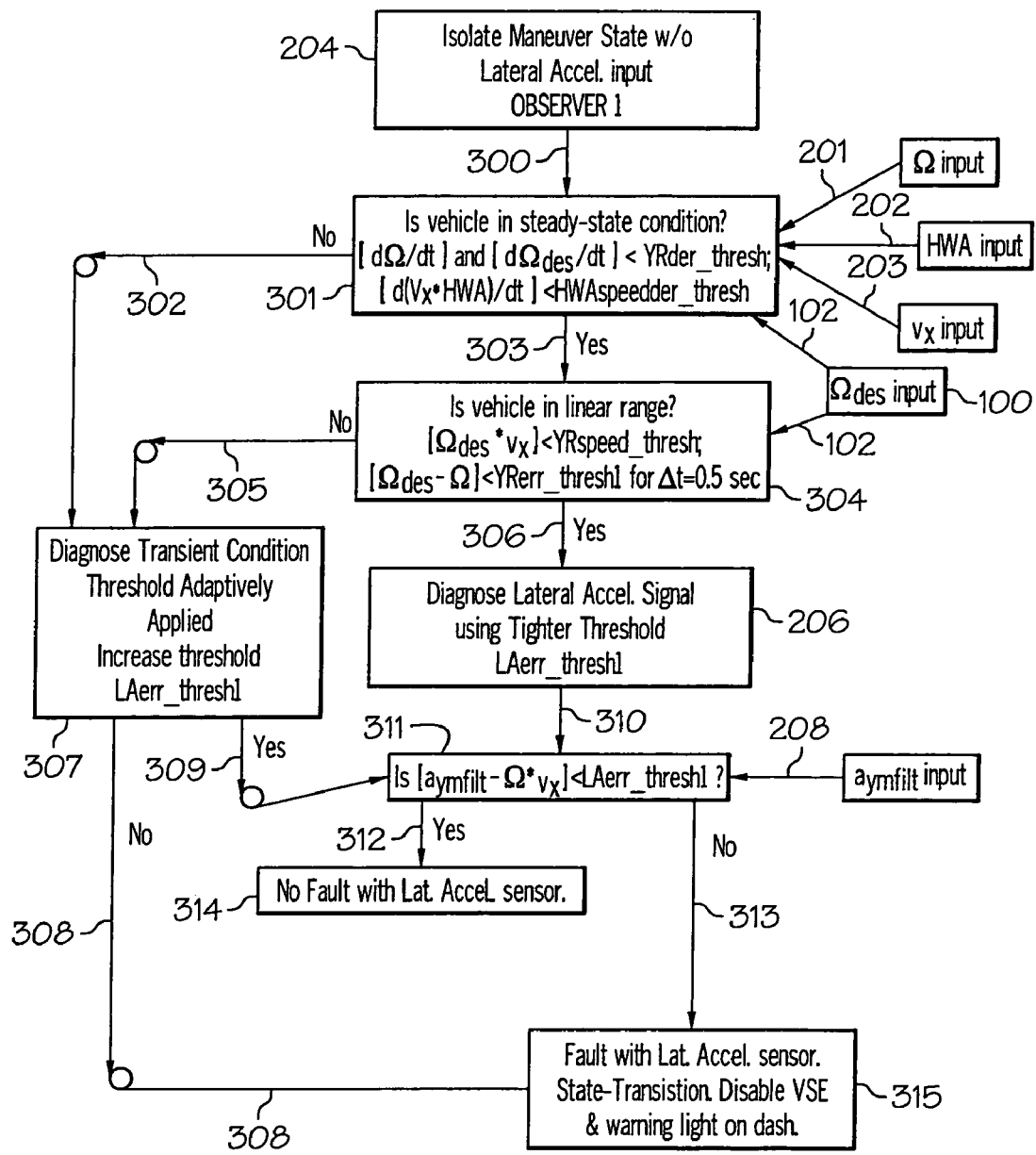
FIG. 3 is a flowchart showing one aspect of the disclosed vehicle stability control algorithm to diagnose a lateral acceleration signal.

A method of detecting failure in the lateral acceleration sensor 208 is illustrated in FIGS. 2 and 3 and mandates steady state and linear handling range computations based on the measured vehicle stability control system 10 inputs of yaw rate 201, HWA 202, vehicle speed 203 and the computed yaw rate desired dynamic ($\Omega_{des}$) input 102.

As shown in FIG. 3, a method for diagnosing a lateral acceleration sensor 208 fault in a vehicle stability control system 10 includes receiving at least one signal indicative of a vehicular measured yaw rate 201; receiving at least one signal indicative of a vehicular measured velocity 203; receiving at least one signal indicative of a vehicular measured hand wheel angle 202; receiving at least one signal indicative of a vehicular computed yaw rate desired 102; selecting a lateral acceleration estimator 301, 304 in accordance with a steady-state 301 and a linear range of handling conditions 304; estimating a lateral acceleration in accordance with the selected linear acceleration estimator 301, 304; applying a plurality of estimated lateral acceleration thresholds 303, 306 to determine a vehicle maneuver state, wherein the plurality of estimated lateral acceleration thresholds 303, 306 may be vehicle specific; selectively apply diagnostic thresholds 206, 307 to the estimated lateral acceleration 310 based on the maneuver state, wherein the selectively applied diagnostic thresholds 206, 307 may be vehicle specific; measuring a lateral acceleration 208 with a lateral acceleration sensor 208; comparing the measured lateral acceleration 208 with the estimated lateral acceleration 310; detecting a true fault 313 with the lateral acceleration sensor 208 when the comparison is not within a selected comparison threshold value 311, wherein the selected comparison threshold value 311 may be vehicle specific; detecting a false fault 312 with the lateral acceleration sensor 208 when the comparison is within the selected comparison threshold value 311; supplying a microprocessor controller 11 to the vehicle stability control system 10, wherein the controller 11 may be configured to take action on the true fault 313 by disabling 315 the vehicle stability control system 10 to prevent unnecessary activation; although alternatively, the controller 11 may be configured to take no action on the false fault 312. Referring to FIG. 3, failed performance criteria signals include 302, 305, 308 and 313, while affirmed performance criteria signals include 303, 306, 309 and 312.

As shown in FIG. 3, the vehicle can be assumed to be in steady-state when: (i) the time derivative of measured yaw rate, $d\Omega/dt$ is small in magnitude (less than YRder_thresh, for example, less than about 0.2 rad/s$^2$) AND (ii) the time derivative of the desired yaw rate $d\Omega_{des}/dt$ is small in magnitude (less than YRder_thresh, for example, less than about 0.2 rad/s$^2$) AND (iii) the time derivative of the product of the steering angle and speed $[d(v_x * HWA)/dt]$ is small in magnitude (less than HWAspeedder_thresh1, for example, less than 9 m*rad/s$^2$). It should be noted that the last condition may be redundant for some vehicles, although at high speeds, yaw rates are fairly small and a transient condition may not be detected when considering only the yaw rates.

Figure 4:
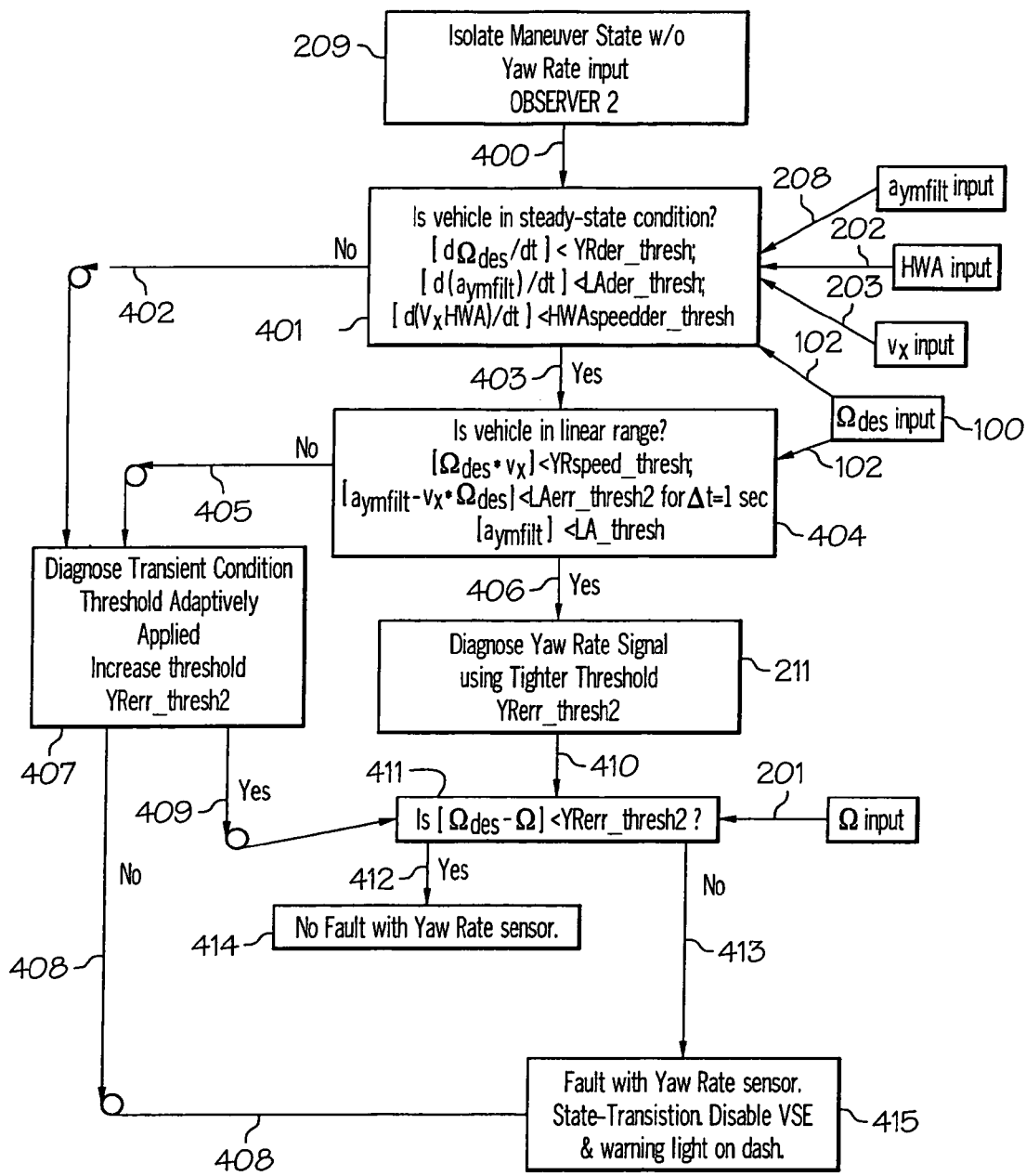
FIG. 4 is a flowchart showing another aspect of the disclosed vehicle stability control algorithm to diagnose a yaw rate signal.
Figure 5:
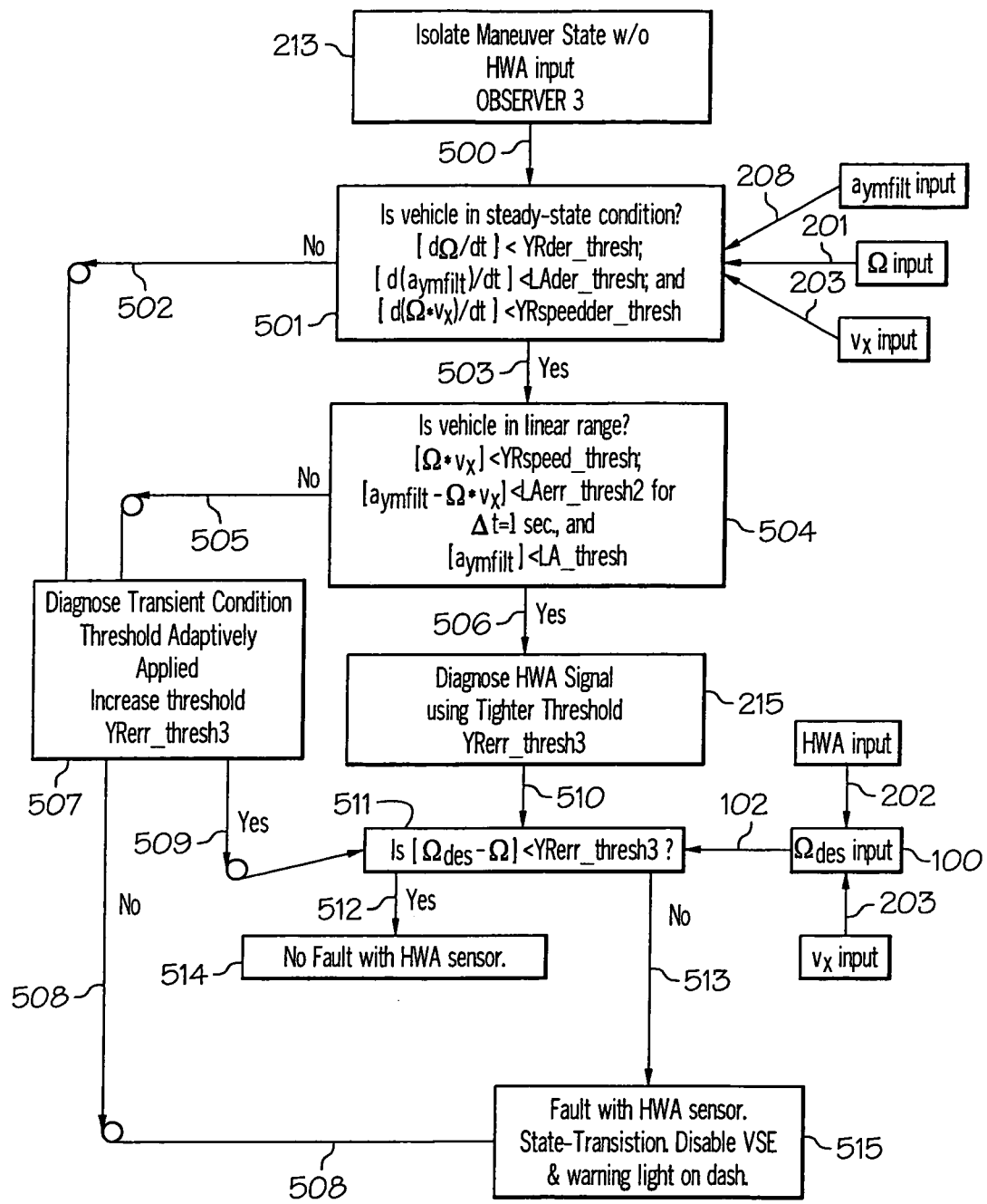
FIG. 5 is a flowchart showing yet another aspect of the disclosed vehicle stability control algorithm to diagnose a hand wheel angle signal.
Figure 6:
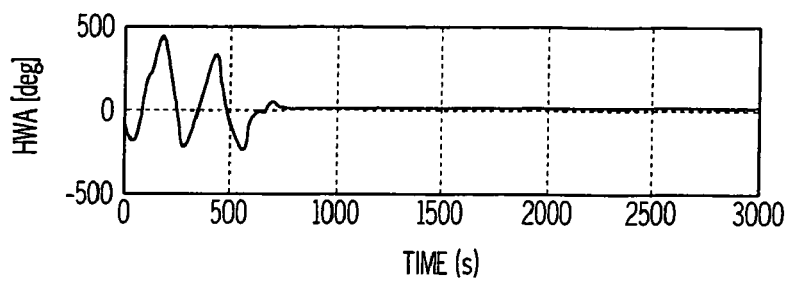
FIG. 6 is a graph of measured HWA test data in accordance with one aspect of the disclosed vehicular stability control system.
Figure 7:
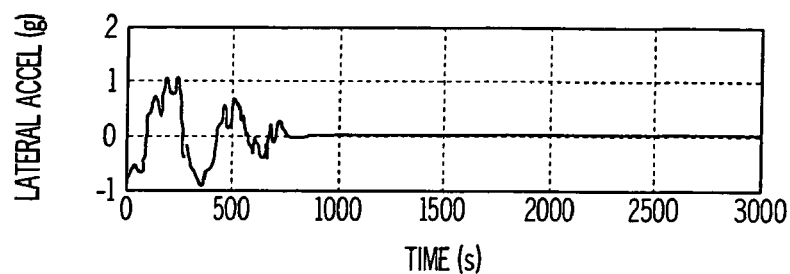
FIG. 7 is a graph of measured lateral acceleration test data in accordance with one aspect of the disclosed vehicular stability control system.

Specific numerical values for the thresholds are provided in the above and below descriptions, as illustrated in FIGS. 3-5, with the understanding that they may be slightly different for other vehicles (not shown) as they depend upon vehicle parameters, in particular the under-steer gradient.

Under-steer gradient is defined as the ratio of change in the (front) steering angle to the change in lateral acceleration during a constant radius turn with very slowly varying speed. For most vehicles, as the speed of the vehicle in a constant radius turn increases, the steering angle has to increase as well. The ratio $K_u$ is the under-steer gradient and may be expressed as $K_u = \Delta\delta/(\Delta a_y)$. Here $\Delta\delta$ is the change in the steering angle and $\Delta a_y$ is the change in the lateral acceleration. The commonly used units are [rad/(m/s²)]. In the linear handling range the under-steer gradient can be expressed as a function of vehicle and tire parameters as follows: $K_u = m_f/C_f - m_r/C_r = [(C_r*b - C_f*a)*M]/(C_f*C_r*L)$. Here $m_f = m*b/L$ is vehicle mass per front axle, $m_r = m*a/L$ is the vehicle mass per rear axle, m is the total mass of vehicle, a and b are the distances of vehicle center of mass to the front and rear axle, respectively, L=a+b is the vehicle wheel-base, $C_f$ and $C_r$ are the cornering stiffness values of both front and both rear tires, respectively.

As shown in FIG. 3, the vehicle is in the linear handling range when: (i) the product of the desired yaw rate and speed $|\Omega_{des}*v_x|$ is small in magnitude (less than YRspeed_thresh, for example, less than 4 m/s²). AND (ii) the yaw rate error, defined as a difference between the desired and measured yaw rate, that is $|\Omega_{des}-\Omega|$ is small in magnitude for a specified period of time (less than YRerr_thresh1, for example less than 0.07 rad/s for a Δt of about 0.5 second).

If vehicle is in a steady-state and in the linear range of handling, then the lateral acceleration signal may be diagnosed as shown in FIG. 3. The difference between the measured lateral acceleration filtered ($a_{ymfilt}$) and the product of measured yaw rate and speed $|a_{ymfilt} - v_x*\Omega|$ should not exceed a threshold value (LAerr_thresh1, for example, less than 2 m/s²), otherwise a failure of lateral acceleration sensor occurred. If vehicle is not at steady-state or not in the linear handling range, the value of the threshold LAerr_thresh1 increases. It should be further noted that the condition $|a_{ymfilt} - v_x*\Omega| <$ LAerr_thresh1 could be triggered by a very large spike in measurement noise, and thereby necessitates that the measured lateral acceleration signal must be filtered.

The lateral acceleration signal is filtered by passing the signal through a noise filter. For example, a noise filter with the transfer function $a_{yfilt}(s)/a_y(s) = \omega_f/(s+\omega_f)$ may be utilized. Here s is the Laplace operand and $\omega_f$ is the filter contrast (representing a suitable cut-off frequency). The transfer function can be implemented on a digital processor using the following time-domain equation: $a_{yfilt}(t) = (1-\omega_f*\Delta t)*a_{yfilt}(t-\Delta t) + (\omega_f*\Delta t)*a_y(t)$. Here Δt is the sampling time. Typical sources of measurement noise in accelerometers are mechanical vibrations of the sensor attachment and electrical noise in the circuit of the sensor due to external disturbances (of magnetic or electric field) which may cause variations of current and voltage in this circuit.

A method of detecting failure in the yaw rate sensor 201 is illustrated in FIGS. 2 and 4 and mandates steady state and linear handling range computations based on the measured vehicle stability control system 10 inputs of lateral acceleration 208, HWA 202, vehicle speed 203 and computed yaw rate desired dynamic ($\Omega_{des}$) input 102.

As shown in FIG. 4, a method for diagnosing a yaw rate sensor 201 fault in a vehicle stability control system 10, includes receiving at least one signal indicative of a vehicular measured lateral acceleration 208; receiving at least one signal indicative of a vehicular measured velocity 203; receiving at least one signal indicative of a vehicular measured hand wheel angle 202; receiving at least one signal indicative of a vehicular computed yaw rate desired 102; selecting a yaw rate estimator 401, 404 in accordance with a steady-state 401 and a linear range of handling conditions 404; estimating a yaw rate in accordance with the selected yaw rate estimator 401, 404; applying a plurality of estimated yaw rate thresholds 403, 406 to determine a vehicle maneuver state, wherein the plurality of estimated yaw rate thresholds 403, 406 may be vehicle specific; selectively apply diagnostic thresholds 211, 407 to the estimated yaw rate 410 based on the maneuver state, wherein the selectively applied diagnostic thresholds 211, 407 may be vehicle specific; measuring a yaw rate 201 with a yaw rate sensor 201; comparing the measured yaw rate 201 with the estimated yaw rate 410; detecting a true fault 413 with the yaw rate sensor 201 when the comparison is not within a selected comparison threshold value 411, wherein the selected comparison threshold 411 value can be vehicle specific; detecting a false fault 412 with the yaw rate sensor 201 when the comparison is within the selected comparison threshold value 411; supplying a microprocessor controller 11 to the vehicle stability control system 10, wherein the controller 11 may be configured to take action on the true fault 413 by disabling 415 the vehicle stability control system 10 to prevent unnecessary activation; although alternatively, the controller 11 may be configured to take no action on the false fault 412. Referring to FIG. 4, failed performance criteria signals include 402, 405, 408 and 413, while affirmed performance criteria signals include 403, 406, 409 and 412.

As shown in FIG. 4, the vehicle can be assumed to be in steady-state when: (i) the time derivative of the desired yaw rate $d\Omega_{des}/dt$ is small in magnitude (less than YRder_thresh, for example, less than about 0.2 rad/s²) AND (ii) the time derivative of measured lateral acceleration, sometimes termed "lateral jerk", $d(a_{ymfilt})/dt$, is small in magnitude (less than LAder_thresh, for example, less than 3 m/s³) AND (iii) the time derivative of a product of the steering angle and speed $d(v_x*HWA)/dt]$ is small in magnitude (less than HWAspeedder_thresh2, for example, less than 10 m*rad/s²).

As shown in FIG. 4, the vehicle is in the linear handling range when: (i) the product of the desired yaw rate and speed $|\Omega_{des}*v_x|$ is small in magnitude (less than YRspeed_thresh, for example, less than 4 m/s², and depends on the under-steer gradient of the vehicle), AND (ii) the difference between the measured and filtered lateral acceleration and the product of desired yaw rate and speed $|a_{ymfilt} - v_x*\Omega_{des}|$ is small in magnitude for a specific period of time (less than LAerr_thresh2, for example, less than 1.0 m/s² for Δt of about 1 second), AND (iii) the measured lateral acceleration filtered, $a_{ymfilt}$, is small in magnitude (less than Lat_thresh, for example, less than 4 m/s²).

If vehicle is in a steady-state and in the linear range of handling, then the yaw rate signal may be diagnosed as shown in FIG. 4. The difference between the desired and measured yaw rates $|\Omega_{des}-\Omega|$ should not exceed a threshold value YRerr_thresh2 (for example, less than 0.175 rad/s), otherwise a failure of yaw rate sensor occurred. If vehicle is not at steady-state or not in the linear handling range, the value of the threshold YRerr_thresh2 is increased. It should be noted that the last threshold may be tighter during straight driving as $|\Omega_{des}*v_x|$, and $|a_{ymfilt}|$ may both be very small in magnitude (for example, about 1 m/s² for Δt of about 1 second).

A method of detecting failure in the HWA sensor 202 is illustrated in FIGS. 2 and 5 and mandates steady state and linear handling range computations based on the measured vehicle stability control system 10 inputs of lateral acceleration 208, yaw rate 201 and vehicle speed 203.

As shown in FIG. 5, a method for diagnosing a hand wheel angle (HWA) sensor 202 fault in a vehicle stability control system 10, includes receiving at least one signal indicative of a vehicular measured lateral acceleration 208; receiving at least one signal indicative of a vehicular measured velocity 203; receiving at least one signal indicative of a vehicular measured yaw rate 201; selecting a HWA estimator 501, 504 in accordance with a steady-state 501 and a linear range of handling conditions 504; estimating a HWA in accordance with the selected HWA estimator 501, 504; applying a plurality of estimated HWA thresholds 503, 506 to determine a vehicle maneuver state, wherein the plurality of estimated HWA thresholds 503, 506 can be vehicle specific; selectively apply diagnostic thresholds 215, 507 to the estimated HWA 510 based on the maneuver state, wherein the selectively applied diagnostic thresholds 215, 507 may be vehicle specific; measuring a HWA 202 with a HWA sensor 202; comparing the measured HWA 202 with the estimated HWA 510; detecting a true fault 513 with the HWA sensor 202 when the comparison is not within a selected comparison threshold 511 value, wherein the selected comparison threshold 511 value may be vehicle specific; detecting a false fault 513 with the HWA sensor 202 when the comparison is within the selected comparison threshold value 511; supplying a microprocessor controller 11 to the vehicle stability control system 10, wherein the controller 11 may be configured to take action on the true fault 513 by disabling 515 the vehicle stability control system 10 to prevent unnecessary activation; although alternatively, the controller 11 may be configured to take no action on the false fault 512. Referring to FIG. 5, failed performance criteria signals include 502, 505, 508 and 513, while affirmed performance criteria signals include 503, 506, 509 and 512.

As shown in FIG. 5, the vehicle can be assumed to be in steady-state when: (i) the time derivative of the measured yaw rate $d\Omega/dt$ is small in magnitude (less than YRder_thresh, for example, less than about 0.2 rad/s$^2$) AND (ii) the time derivative of measured lateral acceleration $d(a_{ymfilt})/dt$, is small in magnitude (less than LAder_thresh, for example, less than 3 m/s$^3$) AND (iii) the time derivative of the product of yaw rate and speed, $[d(\Omega^*v_x)/dt]$ is small in magnitude (less than YRspeedder_thresh, for example, less than 6 m/s$^3$).

As shown in FIG. 5, the vehicle is in the linear handling range when: (i) the product of the measured yaw rate and speed $|\Omega^*v_x|$ is small in magnitude (less than YRspeed_thresh, for example, less than 4 m/s$^2$), AND (ii) the difference between the measured and filtered lateral acceleration and the product of measured yaw rate and speed $|a_{ymfilt}-v_x^*\Omega|$ is small in magnitude (less than LAerr_thresh2, for example, less than 1.0 m/s$^2$ for $\Delta t$ of about 1 second), AND (iii) the measured lateral acceleration filtered, $a_{ymfilt}$, is small in magnitude (less than LA_thresh, for example, less than 4 m/s$^2$).

If vehicle is in a steady-state and in the linear range of handling, then the HWA may be diagnosed as shown in FIG. 5. The difference between the desired and measured yaw rates should not exceed a threshold value that is $|\Omega_{des}-\Omega|$ should be below YRerr_thresh3 (for example, less than 0.122 rad/s), otherwise a failure of steering sensor occurred. The threshold is tighter during straight driving when $|\Omega_{des}^*v_x|$ and $|a_{ymfilt}|$ may be very small in magnitude (for example, about 1 m/s$^2$ for some period of time). The threshold becomes larger when vehicle is not in a steady-state condition or not in the linear range.

The following non-limiting examples enable certain aspects of the disclosure to be more clearly understood.

EXAMPLE 1

The above strategy was tested exhaustively in simulation using a validated vehicle simulation model representing a pick up truck with a hydraulic brake system. The tests included steady state linear and aggressive emergency maneuvers on different surfaces. The results did not show any false diagnosis of a sensor fault. And when a fault was injected, it was isolated and detected correctly within the required fault response time specified by the system safety hazard analysis activity.

Figure 8:
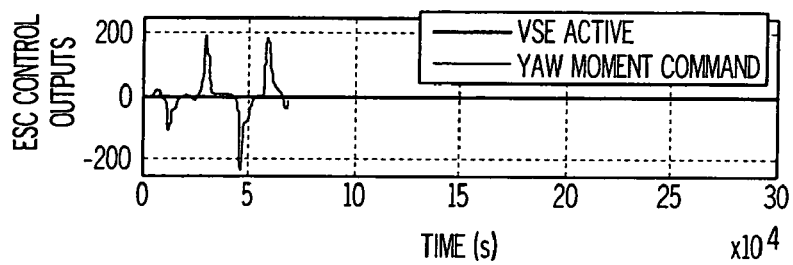
FIG. 8 is a graph of ESC control output test data in accordance with one aspect of the disclosed vehicular stability control system.
Figure 9:
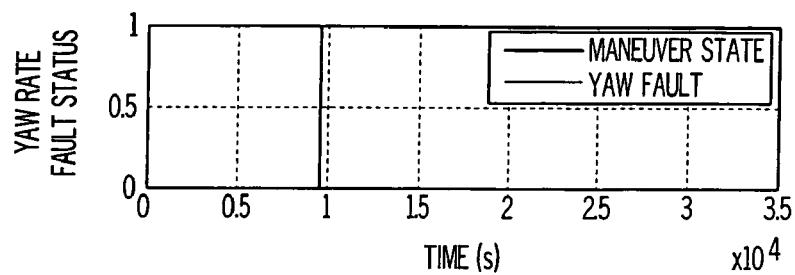
FIG. 9 is a graph of yaw Rate fault status output in accordance with one aspect of the disclosed vehicular stability control system.
Figure 10:
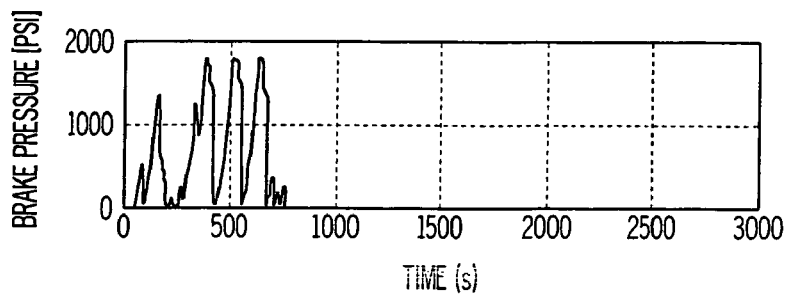
FIG. 10 is a graph of measured brake pressure test data in accordance with one aspect of the disclosed vehicular stability control system.
Figure 11:
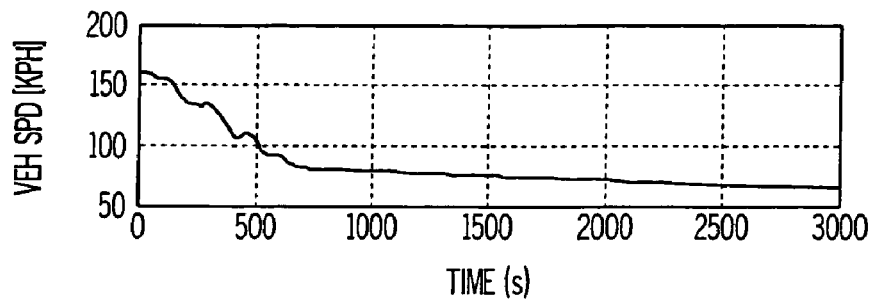
FIG. 11 is a graph of measured vehicle speed test data in accordance with one aspect of the disclosed vehicular stability control system.
Figure 12:
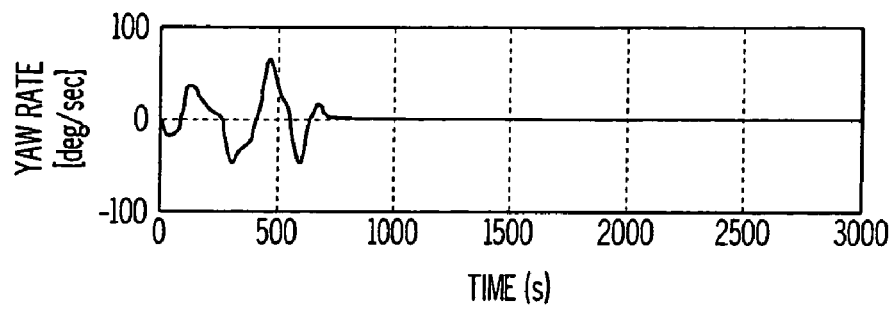
FIG. 12 is a graph of measured yaw rate test data in accordance with one aspect of the disclosed vehicular stability control system.
Figure 13:
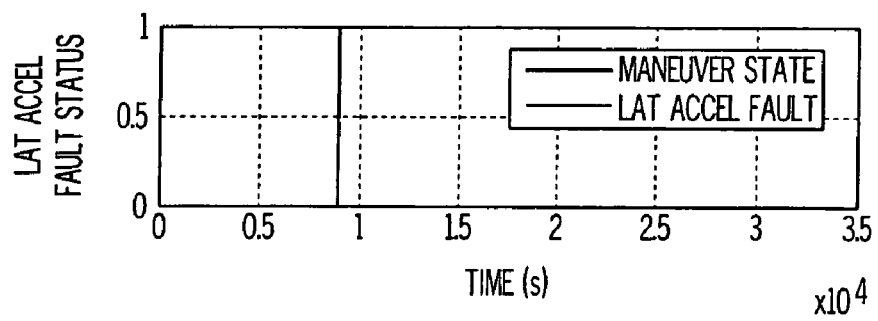
FIG. 13 is a graph of lateral acceleration fault status output test data in accordance with one aspect of the disclosed vehicular stability control system.
Figure 14:
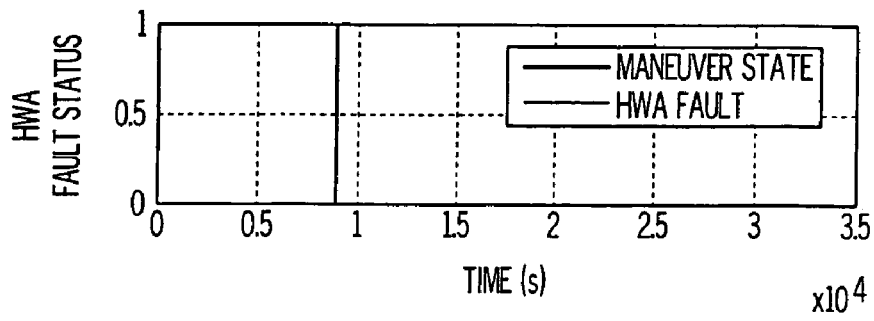
FIG. 14 is a graph of HWA fault status output test data in accordance with one aspect of the disclosed vehicular stability control system.
Figure 15:
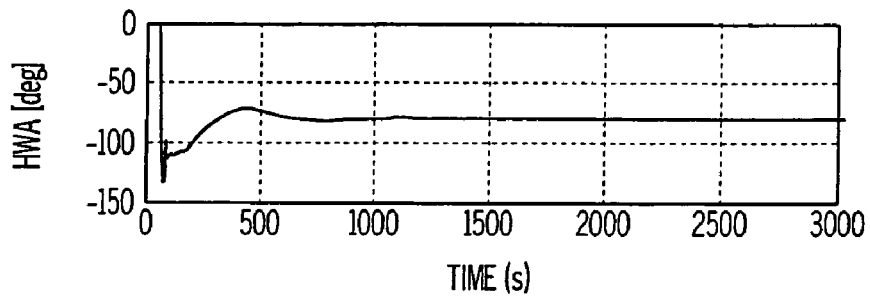
FIG. 15 is a graph of measured HWA test data in accordance with FIG. 3.

In Example 1, the vehicle was placed in a transient emergency maneuver condition on a slippery, icy surface, and the algorithm results (see FIGS. 6-14) showed all observers (see FIGS. 9 and 13-14) successfully identified the maneuver state and the diagnostics (see FIG. 8) did not falsely declare a fault.

EXAMPLE 2

Figure 16:
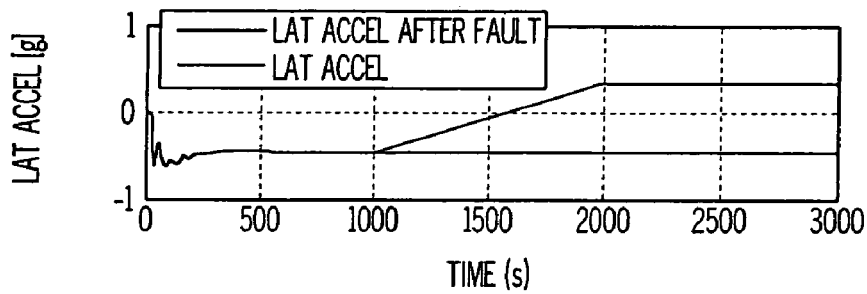
FIG. 16 is a graph of measured lateral acceleration test data in accordance with FIG. 3.
Figure 17:
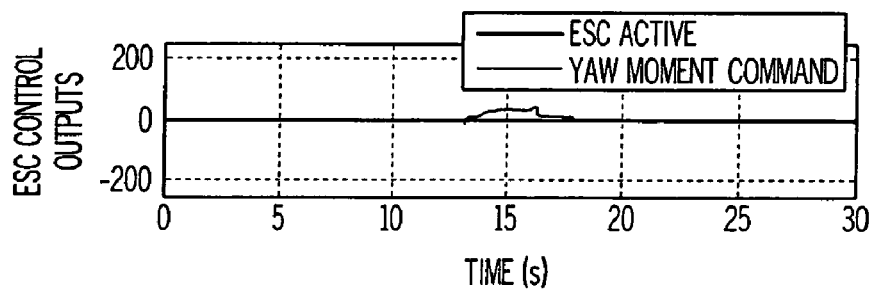
FIG. 17 is a graph of ESC control output test data in accordance with FIG. 3.
Figure 18:
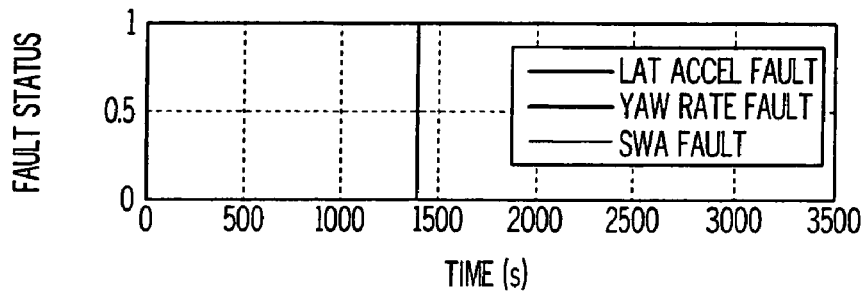
FIG. 18 is a graph of lateral acceleration fault status output, yaw rate fault status output and steering wheel angle fault status output test data in accordance with FIG. 3.
Figure 19:
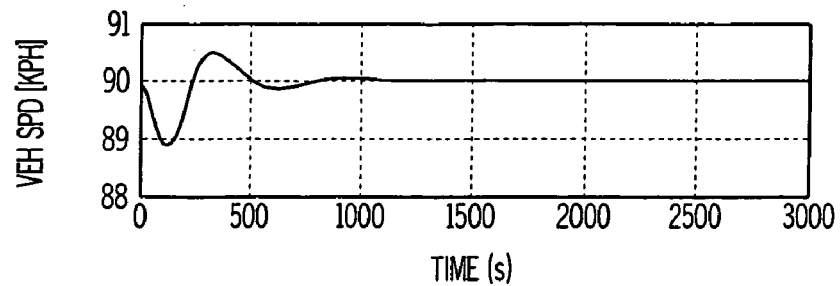
FIG. 19 is a graph of measured vehicle speed test data in accordance with FIG. 3.
Figure 20:
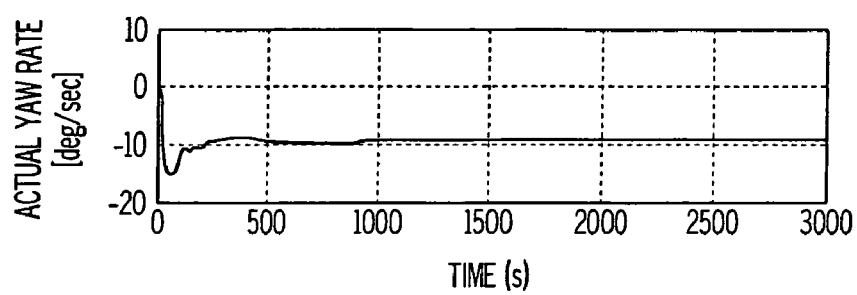
FIG. 20 is a graph of measured yaw rate test data in accordance with FIG. 3.
Figure 21:
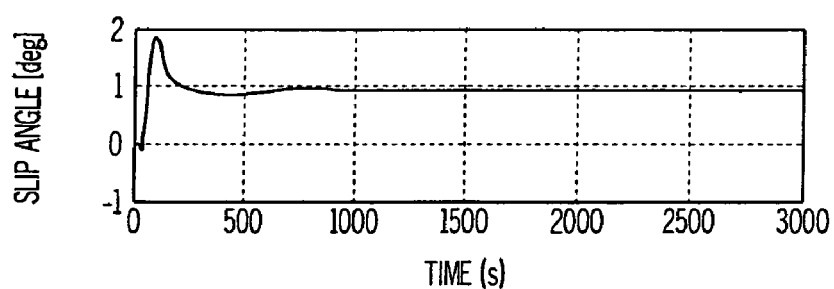
FIG. 21 is a graph of measured slip angle test data in accordance with FIG. 3.
Figure 22:
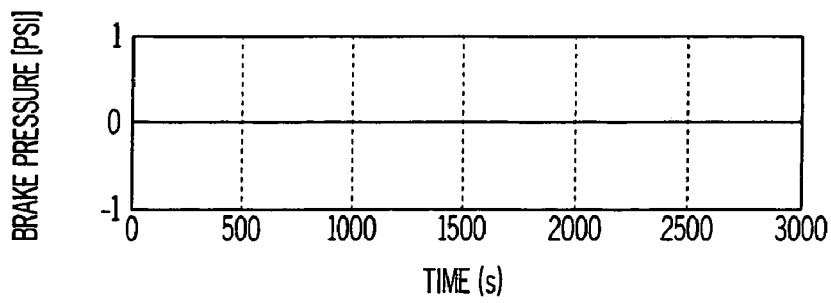
FIG. 22 is a graph of measured brake pressure test data in accordance with FIG. 3.
Figure 23:
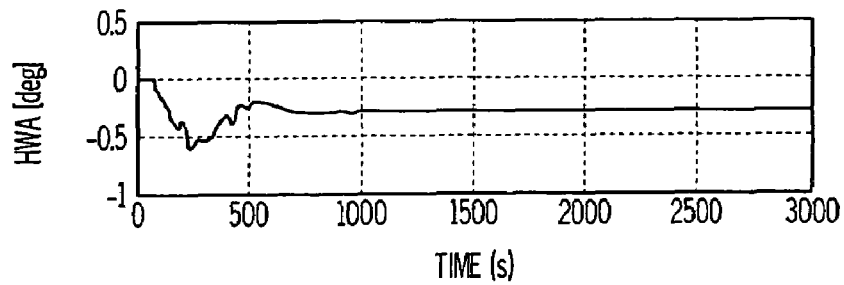
FIG. 23 is a graph of measured HWA test data in accordance with FIG. 4.
Figure 24:
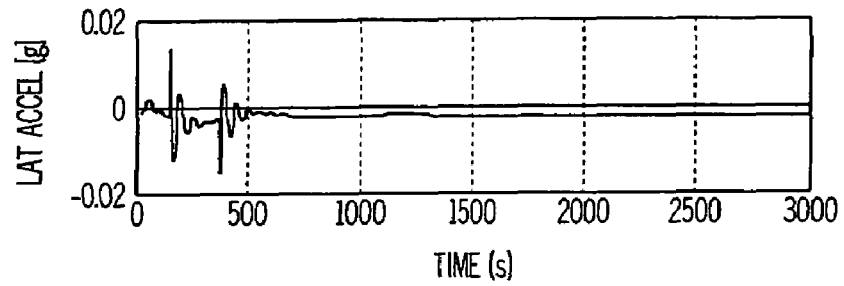
FIG. 24 is a graph of measured lateral acceleration test data in accordance with FIG. 4.
Figure 25:
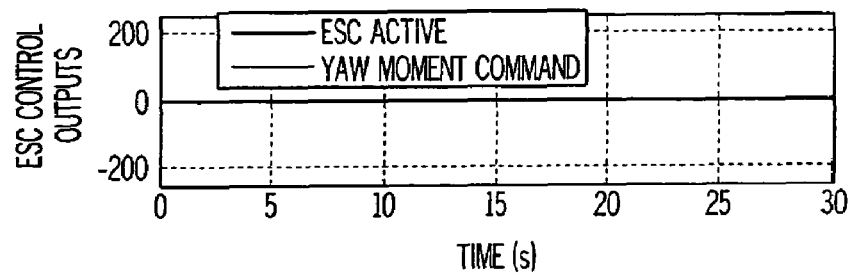
FIG. 25 is a graph of ESC control output test data in accordance with FIG. 4.

In Example 2, the vehicle was located on a dry surface having a constant radius turning maneuver condition wherein a slow changing lateral acceleration fault was injected (see FIG. 16), and the algorithm results (see FIGS. 15-22) showed all observers (see FIG. 18) successfully identified the maneuver state (i.e., without a measured lateral acceleration input) and the diagnostics (see FIG. 18) successfully detected the lateral acceleration signal fault.

EXAMPLE 3

Figure 26:
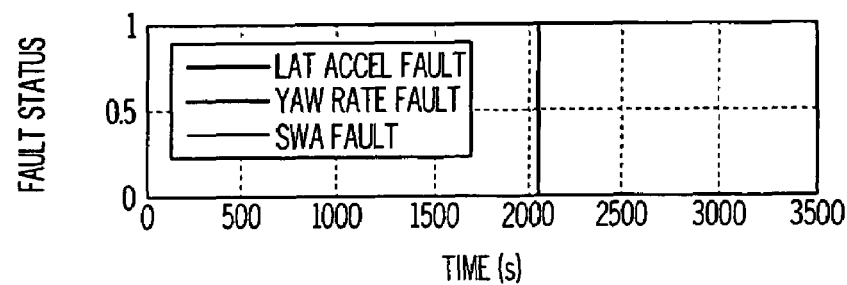
FIG. 26 is a graph of lateral acceleration fault status output, yaw rate fault status output and steering wheel angle fault status output test data in accordance with FIG. 4.
Figure 27:
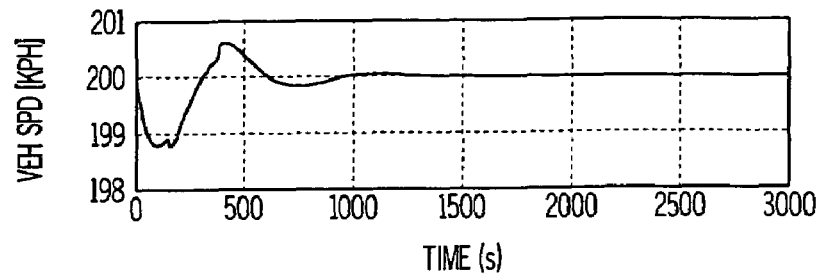
FIG. 27 is a graph of measured vehicle speed test data in accordance with FIG. 4.
Figure 28:
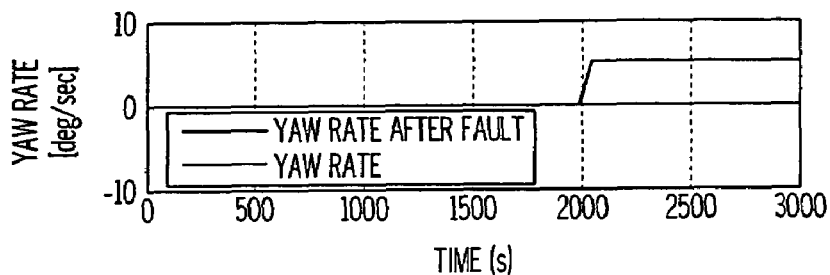
FIG. 28 is a graph of measured yaw rate test data in accordance with FIG. 4.
Figure 29:
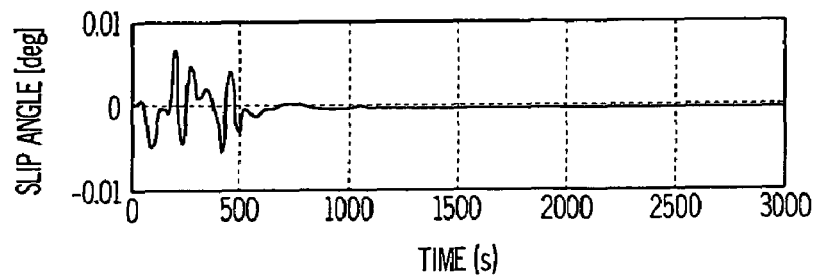
FIG. 29 is a graph of measured slip angle test data in accordance with FIG. 4.
Figure 30:
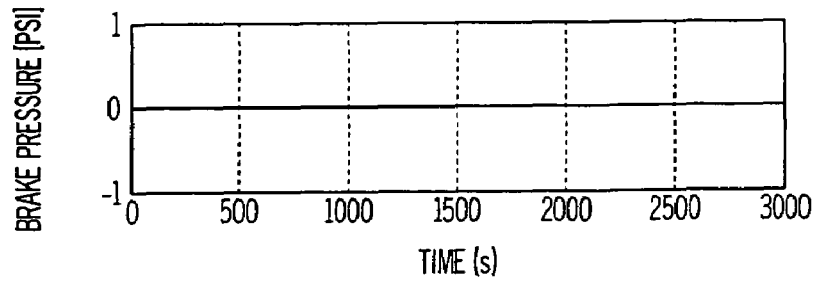
FIG. 30 is a graph of measured brake pressure test data in accordance with FIG. 4.
Figure 31:
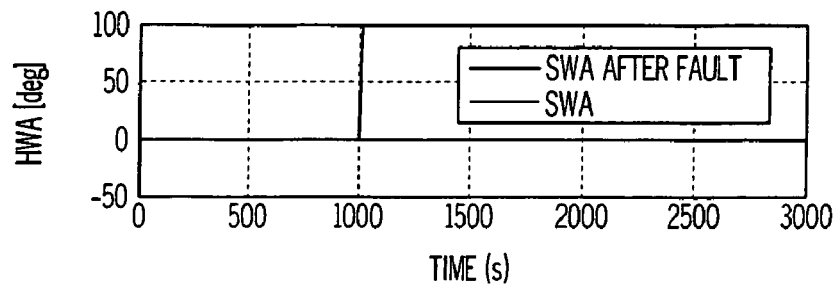
FIG. 31 is a graph of measured HWA test data in accordance with FIG. 5.
Figure 32:
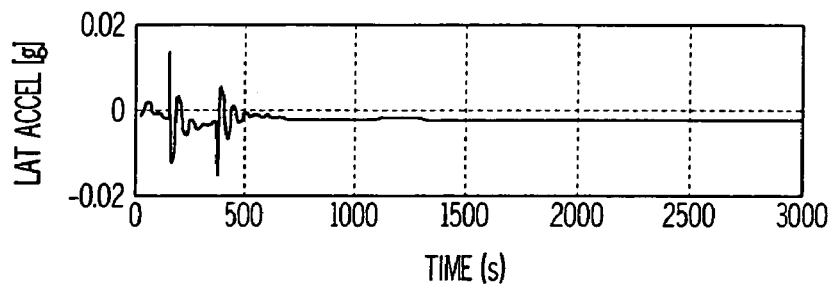
FIG. 32 is a graph of measured lateral acceleration test data in accordance with FIG. 5.
Figure 33:
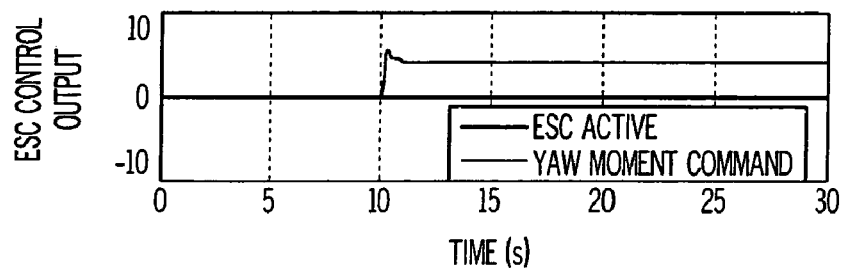
FIG. 33 is a graph of ESC control output test data in accordance with FIG. 5.

In Example 3, the vehicle was located on a dry surface having a straight driving maneuver condition wherein a yaw rate fault was injected (see FIG. 28), and the algorithm results (see FIGS. 23-33) showed all observers (see FIG. 26) successfully identified the maneuver state (i.e., without a measured yaw rate input) and the diagnostics (see FIG. 26) successfully detected the yaw rate signal fault.

EXAMPLE 4

Figure 34:
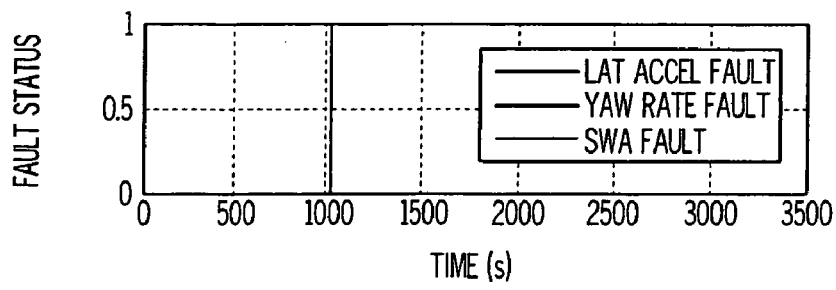
FIG. 34 is a graph of lateral acceleration fault status output, yaw rate fault status output and steering wheel angle fault status output test data in accordance with FIG. 5.
Figure 35:
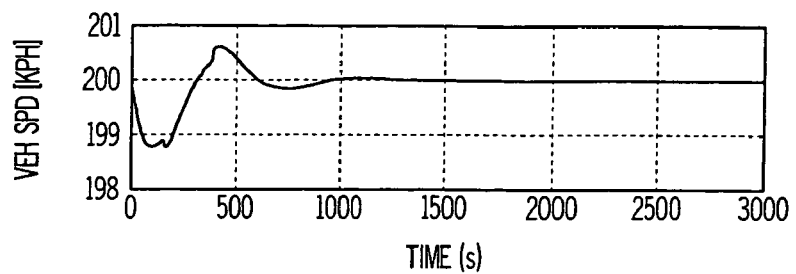
FIG. 35 is a graph of measured vehicle speed test data in accordance with FIG. 5.
Figure 36:
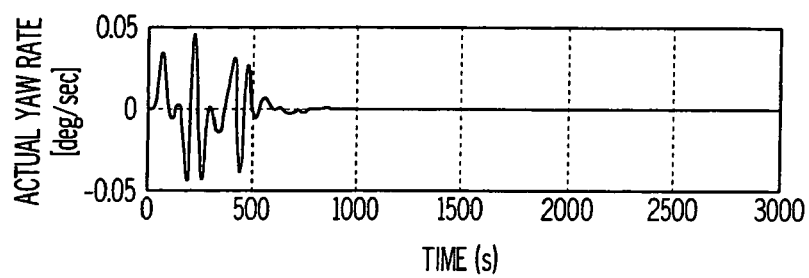
FIG. 36 is a graph of measured yaw rate test data in accordance with FIG. 5.
Figure 37:
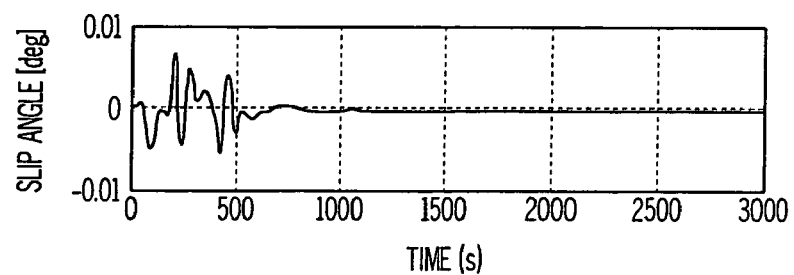
FIG. 37 is a graph of measured slip angle test data in accordance with FIG. 5.
Figure 38:
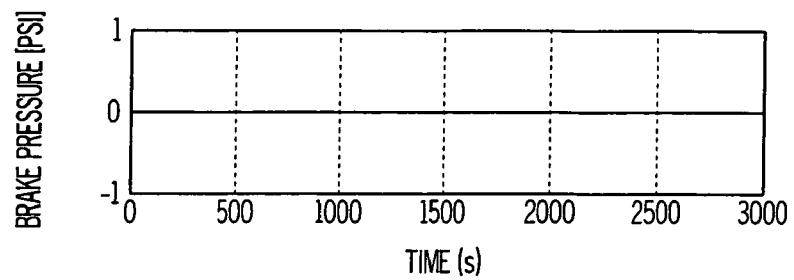
FIG. 38 is a graph of measured brake pressure test data in accordance with FIG. 5.

In Example 4, the vehicle was located on a dry surface having a straight driving maneuver condition wherein a steering wheel angle fault was injected (see FIG. 31), and the algorithm results (see FIGS. 31-38) showed all observers (see FIG. 34) successfully identified the maneuver state (i.e., without a measured HWA input) and the diagnostics (see FIG. 34) successfully detected the HWA signal fault.

Having described the disclosure in detail and by reference to specific embodiments thereof, it will be apparent that numerous variations and modifications are possible without departing from the spirit and scope of the disclosure as defined by the following claims.

What is claimed is:

1. A method for diagnosing a lateral acceleration sensor fault in a vehicle stability control system, comprising:
   receiving at least one signal indicative of a vehicular measured yaw rate; at least one signal indicative of a vehicular measured velocity; at least one signal indicative of a vehicular measured hand wheel angle; and at least one signal indicative of a vehicular computed yaw rate desired;
   selecting a lateral acceleration estimator in accordance with a steady-state and a linear range of handling conditions and estimating a lateral acceleration in accordance with said selected linear acceleration estimator;
   applying a plurality of estimated lateral acceleration thresholds to determine a vehicle maneuver state, wherein said plurality of estimated lateral acceleration thresholds is vehicle specific;
   selectively applying diagnostic thresholds to said estimated lateral acceleration based on said maneuver state, wherein said selectively applied diagnostic thresholds is vehicle specific;
   measuring a lateral acceleration and comparing said measured lateral acceleration with said estimated lateral acceleration;
   detecting a true fault when the comparison is not within a selected comparison threshold value, wherein said selected comparison threshold value is vehicle specific;
   detecting a false fault when the comparison is within said selected comparison threshold value;

activating a microprocessor controller associated with said vehicle stability control system upon occurrence of said true fault by disabling said vehicle stability control system to prevent unnecessary activation; and preventing said microprocessor controller from taking action upon occurrence of said false fault.

2. A method for diagnosing a yaw rate sensor fault in a vehicle stability control system, comprising:

receiving at least one signal indicative of a vehicular measured lateral acceleration; at least one signal indicative of a vehicular measured velocity; at least one signal indicative of a vehicular measured hand wheel angle; and at least one signal indicative of a vehicular computed yaw rate desired;

selecting a yaw rate estimator in accordance with a steady-state and a linear range of handling conditions and estimating a yaw rate in accordance with said selected yaw rate estimator;

applying a plurality of estimated yaw rate thresholds to determine a vehicle maneuver state, wherein said plurality of estimated yaw rate thresholds is vehicle specific;

selectively applying diagnostic thresholds to said estimated yaw rate based on said maneuver state, wherein said selectively applied diagnostic thresholds is vehicle specific;

measuring a yaw rate and comparing said measured yaw rate with said estimated yaw rate;

detecting a true fault when the comparison is not within a selected comparison threshold value, wherein said selected comparison threshold value is vehicle specific;

detecting a false fault when the comparison is within said selected comparison threshold value;

activating a microprocessor controller associated with said vehicle stability control system upon occurrence of said true fault by disabling said vehicle stability control system to prevent unnecessary activation; and preventing said microprocessor controller from taking action upon occurrence of said false fault.

3. A method for diagnosing a hand wheel angle (HWA) sensor fault in a vehicle stability control system, comprising:

receiving at least one signal indicative of a vehicular measured lateral acceleration; at least one signal indicative of a vehicular measured velocity; at least one signal indicative of a vehicular measured HWA; and at least one signal indicative of a vehicular measured yaw rate;

calculating a desired yaw rate based on said measured HWA and said measured velocity in accordance with a steady-state and a linear range of handling conditions;

comparing said calculated desired yaw rate with said measured yaw rate to determine a vehicle maneuver state;

selectively applying diagnostic thresholds to said vehicle maneuver state, wherein said selectively applied diagnostic thresholds is vehicle specific;

detecting a true fault when the comparison is not within a selected comparison threshold value, wherein said selected comparison threshold value is vehicle specific;

detecting a false fault when the comparison is within said selected comparison threshold value;

activating a microprocessor controller associated with said vehicle stability control system upon occurrence of said true fault by disabling said vehicle stability control system to prevent unnecessary activation; and preventing said microprocessor controller from taking action upon occurrence of said false fault.

* * * * *